JOSEPHSON CURRENT STRUCTURES

Filed June 29, 1966

INVENTORS J. E. KUNZLER
H. J. LEVINSTEIN
J. M. ROWELL

BY George S. Indig
ATTORNEY

Jan. 21, 1969 J. E. KUNZLER ET AL 3,423,607
JOSEPHSON CURRENT STRUCTURES
Filed June 29, 1966 Sheet 2 of 2

United States Patent Office 3,423,607

Patented Jan. 21, 1969

3,423,607

JOSEPHSON CURRENT STRUCTURES

John E. Kunzler, Pleasant Grove, Hyman J. Levinstein, Berkeley Heights, and John M. Rowell, Readington Township, Hunterdon County, N.J., assignors to Bell Telephone Laboratories, Incorporated, Murray Hill, N.J., a corporation of New York Filed June 29, 1966, Ser. No. 561,624

U.S. Cl. 307—306 10 Claims

Int. Cl. H03k 3/38

ABSTRACT OF THE DISCLOSURE

A Josephson-type two-particle tunneling device comprises two superconducting bodies defining a current path therebetween. One of the bodies is tapered in at least one dimension forming a wedge and contacts the other body that may be of plane, curved, or of similar tapered surface. The one or both bodies may be tapered in two dimensions and contact each other in a point area less than two mils in diameter. Radio frequency currents of at least one gigacycle per second are obtainable.

This invention relates to superconducting structures manifesting Jospehson two-particle tunneling effects such as are described in or are analogous to those set forth in Physics Letters, volume 1, p. 251 (July 1962) and subsequent related papers. The devices of this invention all utilize at least one tapered superconducting element.

B. D. Josephson's observations described in a series of papers commencing with that cited in the preceding paragraph have been responsible for a new technology which has already resulted in an imposing number of scientific and technological advances. Doubtless, further studies will result in still further enrichment.

In Josephson's earliest work, a two-particle tunneling phenomenon was predicted to occur through a thin dielectric layer separating two superconducting elements. Mr. Josephson immediately postulated certain implications, most of which have now been verified. These include an accompanying high frequency alternating current which, he suggested, promised a mechanism for high frequency generation and for detection.

In Physical Review Letters, volume 13, p. 195 (1964), P. W. Anderson and A. H. Dayem describe effects observed in a superconducting bridge which are, for many purposes, identical to the R.F. Josephson effects observed in the dielectric-containing structure. Subsequent papers treat the bridge and sandwich structure as identical for many purposes, and they are so considered here.

While great strides have been made in the realization of the several Josephson devices, there have been significant obstacles which have resulted from the physical characteristics of otherwise suitable materials. From this standpoint, while it is relatively simple to make Josephson structures out of soft material such as lead, use of Type II superconductors has been virtually prohibited by the need to distort the elements so as to get sufficiently close spacing across the dielectric layer. Bridge structures of the usual type require condensation, generally from a vapor phase, to produce films, and this, too, imposes a limit on the class of materials.

In accordance with the present invention, there is described a structure useful for the observation of the various two-particle superconducting tunneling effects which may utilize virtually any superconductive material. This structure makes use of at least one tapered superconducting element making contact either with another such tapered element or with a plane or curved surface of superconducting material, either directly or through a dielectric layer. The taper may be one-dimensional only, so defining a wedge, or may be two-dimensional, so defining a point. It is seen that the only material requirement imposed is that the material of the taper be amenable to a fabrication technique suitable for producing that configuration. This technique may take the form of machining, casting, etching, electrolytic forming, etc.

Dielectric layers for R.F. Josephson effects which, it is generally assumed, must be of the order of 15 A. or less are conveniently produced in many instances by oxidation or formation of other reaction product with either or both of the elements. The material of the two superconducting elements may be the same or dissimilar.

It is a requirement of the invention that the interface defined either through a dielectric layer or by body-to-body contact between the two elements be produced by use of at least one element which is tapered to its smallest cross-sectional area in the vicinity of the interface. This taper is such that on a two-dimensional plan view it has a large dimension which is a minimum of ten mils in a dimension orthogonal to the current path and a small dimension also orthogonal to the current path which is a maximum of two mils, with substantially all the reduction in cross section occurring over a distance along the current path no greater than twice the said minimum dimension. Preferred minimum and maximum dimensions are twenty mils and one-half mil, respectively. The large dimensional limitation is largely a practical one, the values indicated being required for structural integrity. The minimum dimensions indicated are required or preferred to produce the well-defined Josephson R.F. effects to which the structures of this invention owe their utility. Use of larger minimum dimensions results in a smearing of the R.F. effects due to spacing nonuniformities. While the critical dimensions of tapered bodies are so defined, it should be understood that the minimum dimensions do not necessarily define the physical interface. In certain of these structures, for example, those in which a point or wedge is embedded in a physically softer material, the physical interfacial dimension is larger than that of the tapered body. Since the effect of the embedment is that of a cavity, without other appreciable effect on the R.F. currents, it is surmised that the current path is largely defined only by the smaller dimension of the taper.

Devices of this invention may be utilized for the generation of R.F. Josephson currents already known to lie between 1 gigacycle and 5000 gigacycles per second or higher for field detection of electromagnetic radiation in the same frequency range, for switching and performance of other cryotron-like functions, and as a transducer, changes in $dI/dV$ being extremely sensitive to changes in stress at voltages near the gap energy. Of course, other devices utilizing two-particle tunneling in a dielectric or bridge structure may benefit by use of the inventive configurations.

Detailed description of the invention is expedited by reference to the drawing, in which:

FIG. 1, on coordinates of current and voltage, shows the relationship between these two parameters and two different modes of operation, both resulting in R.F. Josephson currents;

FIG. 2, on the same coordinates, contains curves illustrating operation as an R.F. detector;

Referring again to FIG. 1, the I–V characteristics shown are those plotted for a point-to-flat dielectric film device more fully described in Example 1. The particular structure utilized a point member of niobium and a flat of lead. Curve 1 is the characteristic observed for varying voltage across the structure with sufficient pressure applied to permit the diode to behave as a typical Josephson dielectric structure. For the particular pressure applied, the zero voltage current was about 0.3 milliampere. Increasing voltage to a level of the order of .1 millivolt produced the step structure characteristic of two-particle tunneling. Further increase in voltage produced no substantial increase in current until a voltage of about 2.4 millivolts was attained. This value, slightly below the total energy gap for the two concerned superconductors (niobium—1.4 millivolt and lead—one millivolt), then marked the beginning of a sharp rise terminating at about 2.6 millivolt, this surge characteristic of simple superconducting single-particle tunneling. The remainder of the curve shows the increasing current attributable to a combination of the mechanisms. Curve 2 is plotted from data taken on the same structure, however with somewhat greater pressure applied to the tapered member, so that the device functioned in the manner of a bridge, that is effectively with body-to-body contact. The effect at zero voltage was an increased current approximately linearly proportional to the increased conductivity probably resulting both from the increased interfacial area and the effective removal of the dielectric. Increasing voltage again results in pronounced Josephson steps, which, however, continue at substantially constant slope to the combined energy gap value. Both curves were plotted from the structure in which a resonant influence was introduced by means of a copper sleeve surrounding the diode, although similar characteristics have been observed in the absence of the ring. In certain of these, where sharp steps are in evidence, cavitation is attributed to the depression, in this instance produced in the relatively soft flat member by application of sufficient pressure to the point. Structure in all probability indicating the Josephson step characteristic is seen in this portion of the I–V characteristic, even where contact is made between two members without substantial depression and without introduction of any resonant structure.

Figure 1:
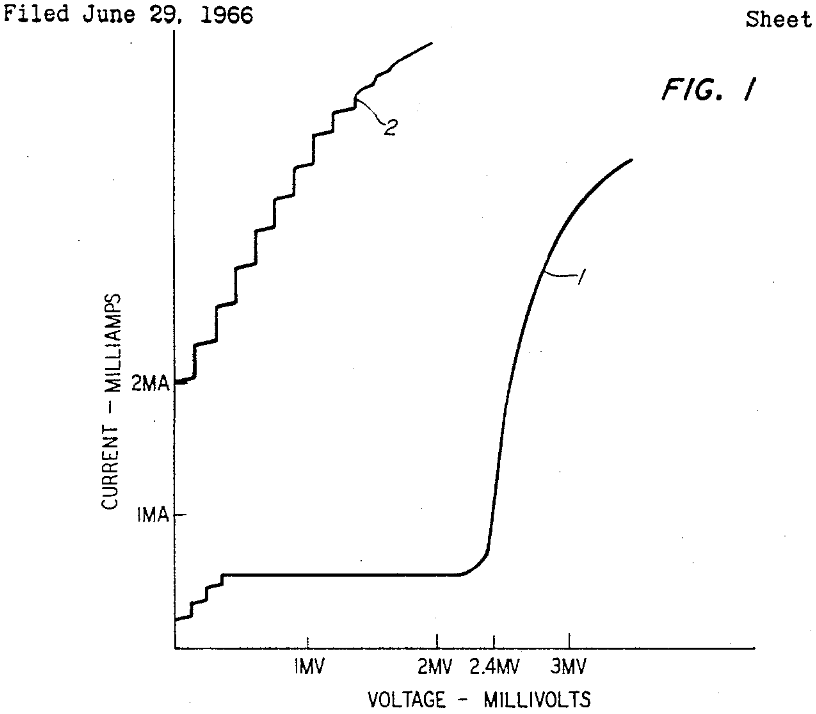

FIG. 1 is, of course, indicative of the use of the structures of this invention as oscillators, as described elsewhere. See Physics Letters, volume 1, p. 251 (1962). As is there described, the frequency of oscillation at any point on the I–V characteristic showing R.F. Josephson current effect, that is, from zero to about 0.5 millivolt on curve 1 and zero to about 2.6 millivolts on curve 2, may be determined from the relationship:

$$f=\frac{2eV}{h}$$

where V is voltage and $2e/h$ equals electronic charge divided by Planck's constant (483.6 megacycles/microvolt). Again, since the frequency of Josephson R.F. oscillation increases with voltage, and since the R.F. Josephson effect is observed only to voltage values slightly in excess of the sum of the energy gaps of the two superconducting members, higher frequencies are obtainable for larger gap materials. This relationship results in the usual preference for the higher transition temperature type II superconductors. Since these materials are not generally amenable to the common fabrication techniques for forming Josephson junctions, it is in this area in which the structures of this invention are most significant.

FIG. 2 is again a plot showing an I–V characteristic, in this instance for a device herein operating as an R.F. detector. For this type of characteristic, the device is operated with sufficient pressure to result in R.F. Josephson effect but with insufficient structure to introduce distinct resonant modes. With no applied field, the device shows the characteristic of curve 5. Here, as in FIG. 1, there is a finite zero voltage current, sometimes called the critical supercurrent, which characteristically occurs at values of the order of one milliampere. With increasing voltage, there is a corresponding increase in current, but the Josephson steps are, if present at all, not evident on the scale on which the curve is plotted. To operate as a detector, the diode is biased so that a current just below the critical supercurrent is caused to flow. Application of an R.F. field results in the reduction of the critical supercurrent. Under these circumstances, the diode follows the characteristic of curve 6, and a finite voltage is measured across the junction. Illustratively, if the device is current biased to level 7, a voltage of the magnitude of 8 results. Further increase in D.C. voltage causes the device to follow the remaining portion of curve 6, with successive steps representing succeeding modes corresponding with harmonic frequencies. It is also possible to calculate the fundamental frequency of the applied R.F. field by applying the relationship set forth above to the first Josephson step.

Figure 2:
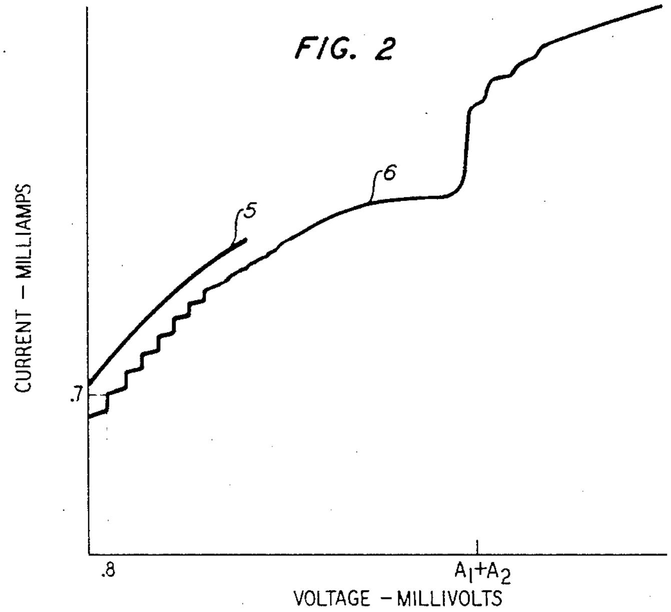

In the device for which the data of FIG. 2 is plotted, conditons are such as to result in the retention of a dielectric layer. This produces the familiar break at a voltage corresponding with the sum of the gap energies for the contacting supercurrent members. The structure appearing on the characteristic curve beyond this break again reflects the applied R.F. field in a manner which has been described by Dayem and Martin (see Physical Review Letters, volume 8, p. 246 (1962). Operation of any of these devices in this manner is contemplated.

Figure 3:
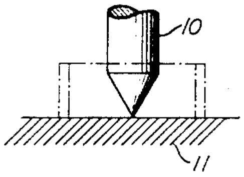
FIG. 3 is a front elevational plan view of a point-to-flat configuration in accordance with the invention.

FIG. 3 depicts a pointed superconducting member 10, in this instance a tapered point contacting a second superconducting member 11, in this instance, a flat body. The effects discussed in this specification have been observed on structures of this general type. In certain instances, resonant characteristics, that is, accentuation of steps in the I–V characteristic, were introduced or emphasized by means of a conducting ring, shown in phantom.

Figure 4:
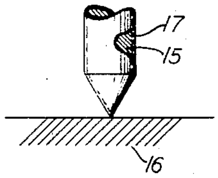
FIG. 4 is a front elevation plan view of a configuration alternative to that of FIG. 3.

In FIG. 4, the device is superficially identical, again consisting of a superconducting tapered member 15, contacting a flat superconducting member 16, however, under conditions such as to result in an effective dielectric layer 17. Use of such layers, which may be produced by anodization, is described more fully under "General Fabrication," and permits observation of characteristics including structure corresponding with a single-particle tunneling effect, as shown on curves 1 and 6.

Figure 5:
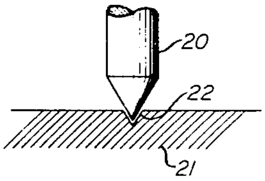
FIG. 5 is a front elevational plan view of a point-to-flat configuration in which the point is embedded in the mating surface.

In FIG. 5, a tapered superconducting member 20, with or without a dielectric layer, is contacted to a flat surface of a physically soft superconducting material 21, with sufficient pressure to result in the indentation 22. As has been described, this technique has produced sufficient cavitation to emphasize the Josephson R.F. step characteristic.

Figure 6:
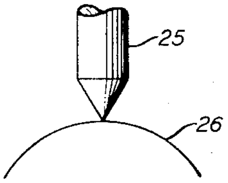
FIG. 6 is a front elevational plan view of a point-to-curve configuration.

In FIG. 6 a tapered member 25 is brought into contact with a curved surface 26. The electrical characteristics are identical to those observed for a contacting taper and flat.

Figure 7:
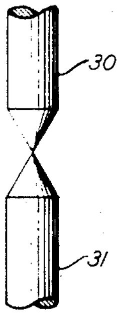
FIG. 7 is a front elevational plan view of a point-to-point configuration.

In FIG. 7, the diode consists of two-contacting tapered superconducting members 30 and 31. As in any of FIGS. 3 through 8, contact may be body-to-body or via a dielectric layer. Electrically, there is little difference between the operational characteristics of the device of FIG. 7 and that, for example, of FIG. 3. From a practical standpoint, some advantage may be gained by the resulting increase in the free space angle available to R.F. emanations.

Figure 8:
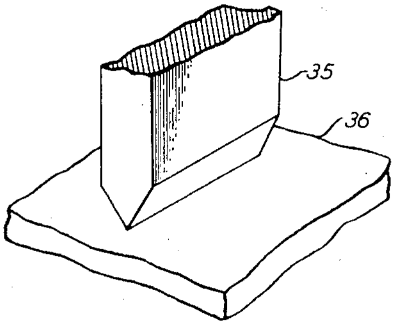
FIG. 8 is a perspective view of a configuration in accordance with this invention providing for increased current flow.

The device of FIG. 8 illustrates a structural approach designed to increase the amount of Josephson current flow. This structure, which consists of a chisel-shaped superconducting member 35, in this instance contacting a flat surface of a superconducting body 36, effectively provides a large number of parallel current paths. This device may, therefore, be considered as a parallel array of a plurality of point-to-flat structures such as that of FIG. 3. If the machining is sufficiently precise, and if the dielectric layer where used is produced by sufficiently uniform current flow, it should be possible to keep the spacing sufficiently constant to produce a structure which is operational over substantially its entire interfacial length.

Figure 9:
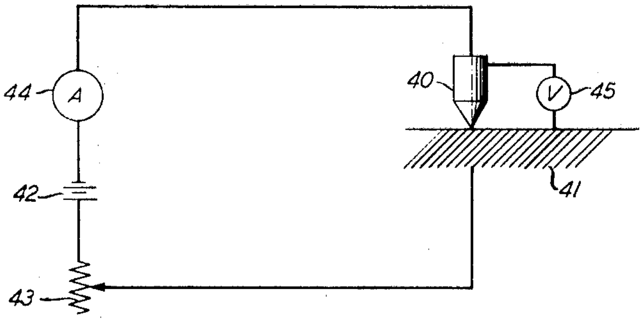
FIG. 9 is a front elevational plan view of a suitable configuration including the circuitry required to operate as an oscillator or detector.

The simple circuit diagram of FIG. 9 includes in rudimentary form the elements required to most conveniently operate any of the devices of this invention, either as an oscillator or a detector. In either event, a diode consisting of tapered member 40 and mating member 41 is biased by means of D.C. source 42 to an appropriate level selected by means of potentiometer 43. Current measuring means 44, series-connected with the diode and the biasing source, and voltage measuring means 45, connected across the junction formed between the two members 40 and 41, expedite selection of the appropriate voltage or current level so as to accomplish the desired end result. Where the device is operating as an oscillator both of the means 44 and 45 should indicate finite values to indicate the existence of the tunneling mechanism, with the measured voltage being a direct determinant of the frequency of the emanations. Where the junction is formed between two separate members 40 and 41 and pressure is adjusted, the optimum value of this parameter is selected by monitoring the current and voltage levels.

Where the device of FIG. 9 is operated as a detector in the Josephson region (reference is here had to curves 5 and 6 of FIG. 2), it is convenient to reduce the value of the resistance offered by element 43 until a finite voltage level results, as indicated on means 45, after which resistance 43 is increased to a value just barely below this threshold (that is, just below the critical supercurrent). Application of an R.F. field results in a finite voltage across the junction, as was discussed in conjunction with FIG. 2. These devices are most advantageously utilized for detection of electromagnetic radiation of the frequency range generally associated with the R.F. Josephson effect, that is, from about one to 5000 gigacycles per second.

If the device of FIG. 9 is to be operated as a detector above the single-particle tunneling threshold in the manner described by Dayem and Martin, reference supra, the current is set to a value slightly in excess of the maximum obtained on the straight-line portion of the characteristic occurring at the total energy gap position. Application of an R.F. field within the appropriate frequency range results in the structure shown in that part of curve 6 in FIG. 2.

The data reported in this description was obtained by use of configurations made up of two separate superconducting bodies, either of identical or dissimilar materials, the pointed member of which was prepared electrochemically. This data may with equal facility be obtained from any other configuration meeting the inventive requirements. Electrolytically prepared points are, however, easily produced with a minimum of equipment, and their use therefore constitutes a preferred embodiment in accordance with this invention. In order to teach this preferred embodiment, the general fabrication technique is outlined below. Following the general description, there are examples describing the specific technique as applied to certain specified materials.

*General fabrication*

A wire generally of the order of tens of mils in diameter is inserted in a metal receptacle containing a suitable electrolytic etching fluid to a depth of several diameters, and is biased negative with respect to the receptacle. A voltage of the order of several volts is maintained for times of the order of from seconds to a very few minutes (of course depending upon voltage concentration, temperature, etc.), with the process being terminated when a suitable point has been formed. Final configurations generally manifest an essentially straight taper, with points having radii of the order of microns.

Where it is desired to deliberately introduce a dielectric layer, it has been found convenient to accomplish this desideratum by anodizing. To this end, the pointed member is biased anodically with respect to a suitable electrode which may again be a metal receptacle, in this instance containing a suitable anodizing fluid. Suitable anodizing fluids are dilute, weak acidic solutions such as citric acid, tartaric acids, etc. Anodizing is typically carried out over a final voltage of from 25–35 volts resulting in a dielectric layer having a theoretical thickness of the order of 250 A.

The final device is then constructed by contracting the pointed wire with or without anodized layer to the other superconducting member. This is conveniently accomplished by means of a simple jig, which for experimental purposes has been provided with means for adjusting pressure. This pressure-adjusting means has permitted variations in spacing between the two superconducting members, most expediently where dielectric layers were deliberately produced by anodization and also has permitted some change in contact area resulting from flattening the pointed member or embedding the member in the mating surface, depending on which of the two members is the softer. As indicated, embedding the point by suitable pressure has resulted in a degree of cavitation which permits direct observation of the typical R.F. Josephson steps. Alternative structures providing the needed resonance include sleeves of suitable conducting materials.

The following examples set forth the actual processing conditions found suitable for fabrication of certain described structures.

EXAMPLE 1

A 30-mil niobium wire was dipped into an aqueous solution of 1.1 part by volume of concentrated hydrofluoric acid plus one part by volume concentrated nitric acid to a depth of 30 mils. The wire was biased eight volts negative with respect to the platinum container. The voltage was maintained for about one minute. The wire was removed from the solution, rinsed in water and dried. Examination of the point indicated a point diameter of less than five microns and an essentially straight taper from the unetched portion of the wire over a length approximately equal to 30 mils.

The pointed wire was anodized in a two percent by weight aqueous solution of citric acid. Anodization was carried out at a voltage of twenty-five volts bias (positive relative to the metal receptacle) until the measured current dropped to zero. The period so required was of the order of a second or less.

For greatest reproducibility it has been found desirable to anodize at voltages of the order of from ten volts to thirty-five volts. It is recognized that such bias levels theoretically result in dielectric layers of the order of 100 or more angstroms, that is, values appreciably higher than the ten or fifteen angstroms generally considered to be a maximum tolerable value for R.F. Josephson observations. Nevertheless, such bias levels have been found to result in the most reproducible apparatus, that is, points which could be repeatedly brought into contact with mating sections without observable deterioration in tunneling characteristics. No explanation is given for this apparent discrepancy. Generally, sharp R.F. Josephson effects were observed only upon application of sufficient pressure to result in a D-C measured resistance of the order of one ohm or less. While it may be theorized that application of such pressure resulted in a lessening of the dielectric layer thickness, this surmise is weakened by the observation that lessening of the applied pressure resulted in termination of the R. F. Josephson effect and in reintroduction of simple single-particle tunneling.

The final structure was then completed by contacting the point so formed with or without dielectric to a mating surface, in this instance of lead, the surface of which was chemically polished in a solution of one part by volume of thirty percent superoxol (thirty percent aqueous hydrogen peroxide) and one part by volume of concentrated acetic acid. After being swabbed with this solution, the surface was rinsed and dried.

The point was brought to bear on the flat with a pressure sufficient to produce a measured D-C resistance of slightly under one ohm. A curve form of the general nature of curve 1 of FIG. 1 was observed by varying voltage to a value of about 3.4 millivolt and reading the resultant current levels. Steps were observed from a zero voltage level of the order of one-third of a milliampere to a level of about one-half milliampere. The sharp break in the curve of about 2.4 millivolts resulted from the total of the energy gaps for the two superconducting materials (1.4 millivolt for niobium and one millivolt for lead). The particular experiment was conducted at 4.2° K. (the boiling temperature of helium at atmospheric pressure). The step structure initially observed was made up of more widely spaced steps than that depicted in FIG. 1. The curve form there depicted resulted only by use of an encircling copper sleeve of an inside diameter of about 125 mils and a height of about one-eighth inch, with the ring in contact with the flat lead surface.

The pressure was then increased until the measured resistance of the diode was of the order of one-tenth ohm or less. The voltage was varied from zero to a value in excess of the total energy gap value of 2.4 millivolts. The initial effect was an increased zero voltage current at a value of about two milliamperes. Step structure, again enhanced by use of the copper sleeve, was in evidence to a value about equal to the total energy gap level. The form of the observed characteristic was that of curve 2 of FIG. 1.

EXAMPLE 2

The procedure of Example 1 was repeated, however, utilizing a thirty-mil tantalum wire. Etching was carried out in a solution made up of twenty-five parts by volume of concentrated sulfuric acid, twelve parts by volume of concentrated nitric acid, and twelve parts by volume of concentrated hydrofluoric acid. Since corrosion proceeds at a somewhat slower rate, the bias was increased to a level of about ten volts. A dielectric layer was again produced in the anodized solution and under the conditions set forth in Example 1. Varying pressures were applied to the point, again brought up against a flat surface of lead. Similar results were observed.

Several other experiments utilizing a variety of superconducting materials were conducted. Variations in the solution compositions and processing parameters suitable to the materials being processed were made.

As has been set forth, the inventive devices depend upon the use of a two-member superconducting structure at least one member of which is tapered as described. In most of the structures described, this taper is two-dimensional. In certain other structures exemplified by FIG. 8, the construction is one-dimensional, so that the interface in the direction orthogonal to this dimension may be considered to define a parallel array of junctions.

The use of structures effectively affording direct body contact without interposition of a dielectric layer permits greater current flow while retaining the R.F. Josephson tunnel effect. Such structures may be prepared by contacting separate members with or without initial dielectric layers, as described under "General Fabrication."

Regardless of which configuration is chosen, diodes of this invention are considered by use of separate contacting bodies making contact with a maximum interface dimension, as described, in which at least one of the two contacting members is tapered at least down to such dimension, with the taper extending a length equal to at least twice the maximum dimension of that member before the taper. It is this configuration that optimizes R.F. effects upon which these devices depend while expediting construction.

The invention has been described in terms of a limited number of embodiments. While certain of these are considered to represent preferred embodiments, other structures may take advantage of the inventive teachings. Similarly, other effects attendant upon the Josephson R.F. phenomenon may be maximized by the tapered structures of the invention. Any such variations showing their operation to the principles through which this invention has advanced the art are considered to be within the scope of the appended claims.

What is claimed is:

1. R.F. circuit element operating at a frequency of at least one gigacycle per second comprising two superconducting bodies defining a current path through an interfacial region therebetween, at least one of such bodies having a two-dimensional section parallel to the said current path, which section is tapered from a minimum dimension of ten mils orthogonal to the current path to a maximum dimension of two mils orthogonal to the current path, the said latter dimension defining that portion of said one body which contacts the second body, the said bodies thereby defining a diode manifesting R.F. at a frequency of at least one gigacycle per second.

2. Element of claim 1 in which the said minimum and maximum dimensions are twenty mils and one-half mil, respectively.

3. Element of claim 1 in which said current path includes a dielectric layer at the contacting region of the said bodies.

4. Element of claim 1 in which the dielectric layer is an anodized layer.

5. Element of claim 1, together with means for biasing the said diode.

6. Element of claim 5, together with means for biasing the said diode to a voltage level at least sufficient to result in a critical supercurrent.

7. Element of claim 6, together with current and voltage measuring means for determining the operating condition of the said diode.

8. Element of claim 7, together with means for detecting R.F. emanations in the described frequency range.

9. Element of claim 5, together with means for producing current flow through the diode at a level barely below that of the critical supercurrent.

10. Element of claim 9, together with means for distinguishing between a zero and finite voltage drop across said diode.

References Cited

Physical Review Letters; vol. 10, No. 6, pp. 230–232, Mar. 15, 1963.

Physical Review Letters; vol. 10, No. 11; pp. 479–481, June 1, 1963.

Physical Review Letters; vol. 11, No. 2; pp. 80–82, July 15, 1963.

Proceedings of the IEEE; vol. 54, No. 4; pp. 560–574, April 1966.

JAMES D. KALLAM, *Primary Examiner.*

U.S. Cl. X.R.

331—107; 317—236